United States Patent [19]

Mizuno et al.

[11] Patent Number: 5,206,676
[45] Date of Patent: Apr. 27, 1993

[54] PHOTOGRAPHIC FILM CASSETTE

[75] Inventors: Kazunori Mizuno; Masuhiko Hirose, both of Kanagawa, Japan

[73] Assignee: Fuji Photo Film Co., Ltd., Kanagawa, Japan

[21] Appl. No.: 945,592

[22] Filed: Sep. 16, 1992

Related U.S. Application Data

[63] Continuation of Ser. No. 685,774, Apr. 16, 1991, abandoned.

[30] Foreign Application Priority Data

Apr. 20, 1990 [JP] Japan .................................. 2-105849
May 14, 1990 [JP] Japan .................................. 2-123494

[51] Int. Cl.⁵ .......................................... G03B 17/26
[52] U.S. Cl. ........................................ 354/275; 242/71.1
[58] Field of Search ................. 354/21, 275; 242/71, 242/71.1

[56] References Cited

U.S. PATENT DOCUMENTS

| | | | |
|---|---|---|---|
| 2,336,278 | 12/1943 | Mihalyi | 354/214 |
| 2,360,255 | 10/1944 | Mihalyi | 354/212 |
| 2,364,381 | 12/1944 | Mihalyi | 242/71 |
| 2,521,935 | 9/1950 | Monroe | 227/81 |
| 2,552,200 | 5/1951 | Mihalyi | 242/71.1 |
| 3,467,340 | 9/1969 | Rosenburgh | 242/197 |
| 3,556,435 | 1/1971 | Wangerin | 242/210 |
| 3,627,229 | 12/1971 | Wangerin | 242/210 |
| 3,627,230 | 12/1971 | Wangerin | 242/210 |
| 3,677,499 | 7/1972 | Wangerin | 242/210 |
| 3,797,777 | 3/1974 | Hosono et al. | 242/197 |
| 3,945,584 | 3/1976 | Mangan | 242/71.1 |
| 4,407,579 | 10/1983 | Huff | 354/275 |
| 4,634,071 | 1/1987 | Hertel | 242/71.1 |
| 4,832,275 | 5/1989 | Robertson | 354/275 |
| 4,834,306 | 5/1989 | Robertson et al. | 354/275 |
| 4,848,693 | 7/1989 | Robertson | 242/71.1 |
| 4,880,179 | 11/1989 | Beach | 242/71.1 |
| 4,889,292 | 12/1989 | Loewe et al. | 354/275 |
| 4,962,401 | 10/1990 | Takahashi | 354/275 |
| 4,998,123 | 5/1991 | Smart | 354/275 |
| 5,003,334 | 3/1991 | Pagano et al. | 354/275 |

FOREIGN PATENT DOCUMENTS

| | | |
|---|---|---|
| 2921379 | 11/1990 | Fed. Rep. of Germany . |
| 57-190948 | 11/1982 | Japan . |
| 708779 | 5/1954 | United Kingdom . |
| 2072622 | 10/1981 | United Kingdom . |

*Primary Examiner*—David M. Gray
*Attorney, Agent, or Firm*—Sughrue, Mion, Zinn, Macpeak & Seas

[57] ABSTRACT

In a photographic film cassette, light trapping fabric is provided on each of two inside surfaces of a film passage mouth which define a film passageway. Inner recesses, retracted from the inside surfaces, have the inner edges of the light trapping fabric attached thereto, with an adhesive agent enclosing the inner edges. In a preferred embodiment, tiny grooves are formed in the recesses to provide an increased attaching force, so that a considerable degree of attachment can be maintained. Further, the cassette has two shell halves which are joined together at respective edges. A projection is formed at a first one of those edges. The second edge has a contact projection thereon, for fitting in an inside recess of the first edge. Also, a crooked portion is formed along the juncture of the respective edges. As a result, no light will come through the spacing beside the film. A film leader is advanced through the film passageway by rotating the spool to an outside of the film passage mouth. When the film leader is forced to advance, it will never peel off the light trapping fabric, and so can be advanced reliably without being stopped by the light trapping fabric.

17 Claims, 8 Drawing Sheets

PHOTOGRAPHIC FILM CASSETTE

This is a continuation of application Ser. No. 07/685,774 filed Apr. 16, 1991, now abandoned.

BACKGROUND OF THE INVENTION

The present invention relates to a photographic film cassette, and more particularly, to a film cassette providing reliable prevention of light from reaching photographic film contained therein.

A photographic film cassette contains photographic film, e.g. negative film, in light-tight fashion in a cassette shell. The negative film is fed outside the cassette through a film passage mouth formed on the cassette shell. Light trapping fabric, or "plush", is attached to the sides of the film passage mouth by means of an adhesive agent or double-coated adhesive tape so as to contact both surfaces of the negative film. The light trapping fabric consists of black-dyed velvet made of base fabric and pile threads densely planted thereon. Making the pile threads dense fills the film passage mouth to shield the inside of the cassette shell from light.

It is known to form a cassette shell out of a plurality of molded plastic shell components. In a film cassette disclosed in Japanese Patent Laid-Open Publication No. 57-190948, the cassette shell is formed by mounting a cassette cap on a container component of thermoplastic material by inserting the cap in a direction parallel to the spool. This cassette cap covers one lateral edge of the film passage mouth, so that it is possible to shield the inside from light which comes up to the edge of the film passage mouth.

In U.S. Pat. Nos. 4,832,275 and 4,834,306, a cassette is provided with separation claws for separating a film leader from the film roll to direct it to the film passage mouth. Either annular ridges formed inside the cassette shell, or circumferential lips formed on flanges of the spool, prevent the film from becoming loose on the roll. In both patents, rotation of the spool can cause the film leader to advance through the film passage mouth. Before and after using the film in a camera, the entire length of the film is wound up and contained in the cassette shell up to its leading end.

The cassette shell of such a self-advancing film cassette consists of two molded shell halves which are separated at a juncture dividing the film passageway and including the rotary axis of the spool. The edges of the shell halves forming the juncture are provided with stepped portions which prevent light from entering the cassette shell through the juncture. Accordingly, this self-advancing film cassette is advantageous not only because of the portability of the cassette, but also because of the cassette's improved light-shielding property.

However, the construction of this self-advancing film cassette makes it difficult to retain a strong adhesion by an adhesive agent or a double-coated adhesive tape, because direct pressure to the surface of the light trapping fabric bends down the pile threads and thus decreases the light-trapping property. Attachment by means of double-coated adhesive tape is disadvantageous because it might drop down from the film passageway under a condition of high temperature and high humidity. Although, in a self-advancing film cassette as disclosed in U.S. Pat. No. 4,834,306, the force applied to the spool for advancing the film is made minimal by directing the film leader to the light trapping fabric in a middle position equidistant from both upper and lower inside surfaces of the film passageway, the film leader may not be advanced to the outside when the force for rotating the spool is insufficient to advance the film leader against the inner edges of the light trapping fabric. There is another problem in that forcing the leading end of the negative film to advance may peel off the light trapping fabric if the light trapping fabric is not attached firmly to the film passageway.

It is difficult to construct a self-advancing film cassette by means of a container component and a cassette cap, as disclosed in Japanese Patent Laid-Open Publication No. 57-190948, by adding annular ridges or separation claws as disclosed in U.S. Pat. Nos. 4,832,275 and 4,834,306, because the container component is molded integrally from plastic, though light can be shielded advantageously at the lateral ends of the film passage mouth. Thus, this construction is disadvantageous in its lack of portability and its low-shielding property in the position at the center of the film. Referring to FIGS. 14 and 15, 135-type negative film 4 recently has been provided with DX code 60, which is recorded optically on lateral edge portions 4a outside perforations 45, and which represents various information such as the type negative film 4. The code 60 also is used for printing after development.

In a cassette 113 such as that disclosed in U.S. Pat. Nos. 4,832,275 and 4,834,306, a spacing 78 is defined between upper and lower shell halves 114 and 116 inside a juncture 117 at both lateral ends of a film passage mouth 12 when edges of both shell halves 114 and 116 forming the juncture 117 are fitted together on the outside of the cassette 113. Because the spacing 78 extends inside the cassette 113, light 79 incident upon the spacing 78 enters the inside of the cassette 113 through the extension of the spacing 78. With the cassette 113 unloaded from a camera (not shown) after winding up the negative film 4 in the cassette shell, the light 79 might cause fogging on lateral edge portions 4b of the film, making the DX code illegible at the time of printing. A spacing 124 is defined between flanges 54 and the negative film 4 would on a spool 5. The light 79 through the spacing 124 also might cause fogging on the lateral edge portions 4b of a plurality of outer turns of the wound film 4.

SUMMARY OF THE INVENTION

In view of the foregoing, it is one object of the present invention to provide a photographic film cassette having light trapping fabric attached firmly thereto so as to retain the light-trapping property.

It is another object of the present invention to provide a photographic film cassette which is sufficiently capable of preventing fogging on lateral edge portions of the negative film.

It is still another object of the present invention to provide a photographic film cassette in which rotation of a spool causes a film leader to advance reliably outside the cassette shell.

In order to achieve the above and other objects and advantages of this invention, a photographic film cassette is constituted by two light trapping members, provided each on upper and lower inside surfaces of a film passageway, for trapping light, and at least one inner recess portion retracted from the upper and lower inside surfaces, or inclined on the upper and lower inside surfaces, so as to increase a degree of retraction from the upper and lower inside surfaces in a direction toward an inside of the cassette shell, to facilitate attachment of at least one of inner edges of the respective light trapping members with respect to the cassette shell, so as to attach at least that inner edge to a position retracted from the upper and lower inside surfaces. Structure also is provided in the inventive film cassette to enclose the inner edges in order to attach the light trapping fabric to the film passageway. According to a preferred embodiment, a rough portion is formed in the respective recess portions for retaining firm attachment of the light trapping members to the film passageway. The light trapping fabric is attached firmly, to retain the light-trapping property.

The inventive film cassette further is constituted by light-shielding structure, formed in a juncture between first and second cassette shell halves, for shielding a lateral edge portion of the film from light. According to a preferred embodiment, the first and second shell halves have respective first and second edges formed thereon to facilitate the joining together of the shell halves to form the juncture. The light-shielding structure includes a first projection formed at the first edge, and an inside projection of the second edge formed inside the second shell half for fitting in an inside recess of the first edge formed inside the first shell half at a bottom of the first projection. According to another preferred embodiment, the light-shielding structure is constituted by a deformed portion formed along the juncture. Fogging is prevented sufficiently on the lateral edge portions of the film.

Further, the inventive photographic film cassette is constituted by structure for advancing a film leader through the film passageway by rotating the spool in a direction toward an outside of the film passage mouth. Rotation of the spool causes the film leader to advance reliably to the outside of the cassette shell.

BRIEF DESCRIPTION OF THE DRAWINGS

The above and other objects and advantages of the present invention will become more apparent from the following detailed description when read in connection with the accompanying drawings, in which.

DETAILED DESCRIPTION OF THE PREFERRED EMBODIMENTS

Figure 1:
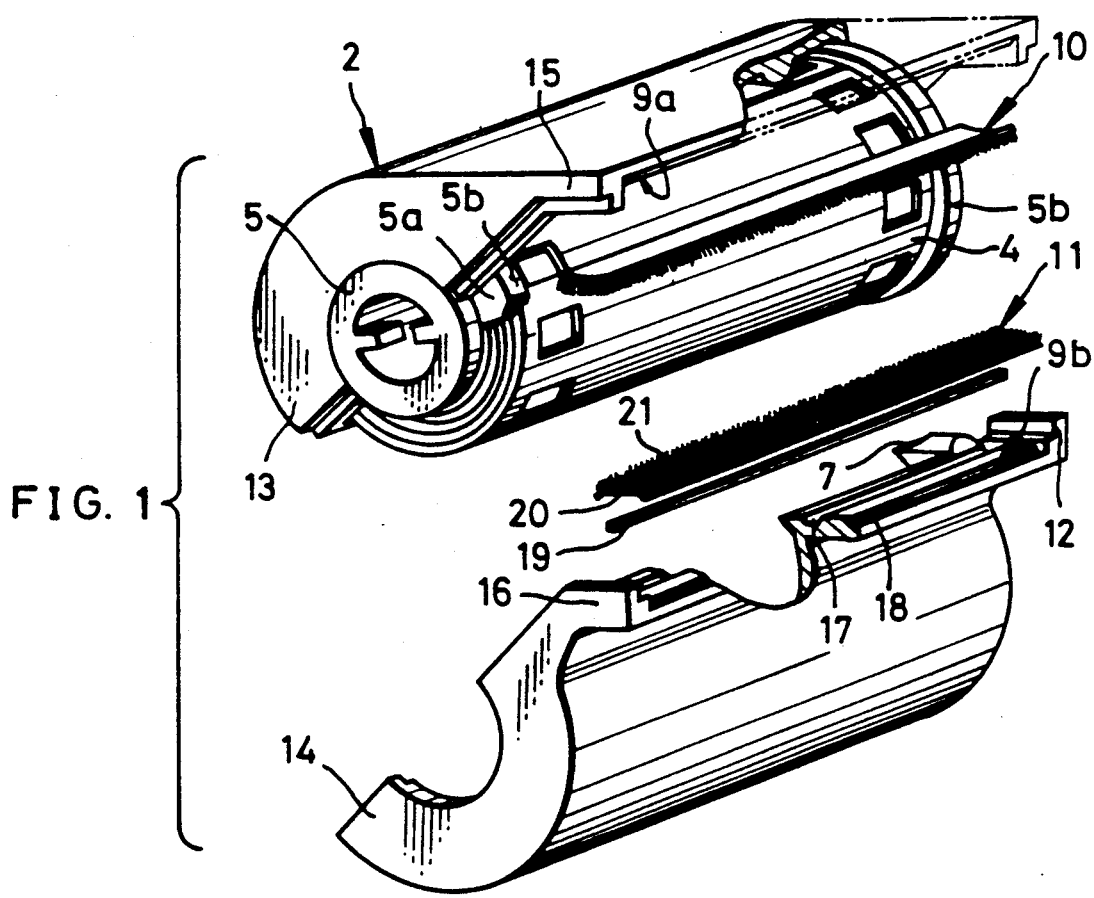
FIG. 1 is a perspective view of a photographic film cassette according to a preferred embodiment of the present invention.
Figure 2:
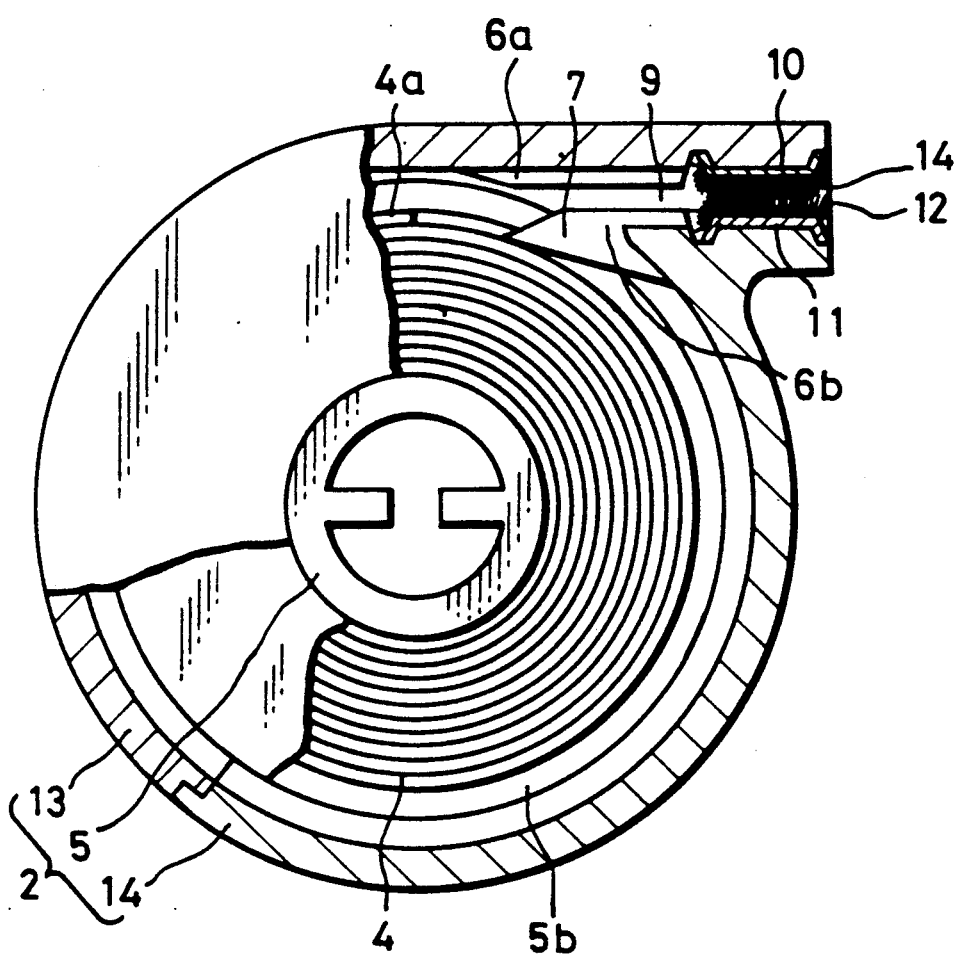
FIG. 2 is a sectional view of an inside of the cassette shown in FIG. 1.

Referring to FIGS. 1 and 2, a film cassette 2 is constituted by photographic film, e.g. negative film 4 wound on a spool 5 contained therein, and a cassette shell molded from polystyrene resin having a light-shielding property. The cassette shell consists of an upper shell half 13 and a lower shell half 14, each having a substantially semicylindrical shape. Flanges 5a are formed at positions near both ends of the spool 5 to keep flat both lateral sides of the film roll 4, and to prevent light from entering through a sliding space between the spool 5 and the shell halves 13 and 14. Circumferential lips 5b are formed integrally on the circular edges of the flanges 5a to prevent the negative film 4 from loosening by receiving both lateral edges of the outermost turn of the film roll 4. This construction causes the clockwise rotation of the spool 5 to rotate a leading end 4a of the negative film 4 in the unwinding direction.

A pair of guide ridges 6b, formed on the lower shell half 14, are provided with separation claws 7 on inner ends thereof. The lateral sides of the separation claws 7 release the lips 5b from the film roll 4 by pressing part of the lips 5b outwardly. The tips of the separation claws 7 separate the leading end 4a of the film from the outermost turn of the roll when in contact with the leading end 4a. The guide ridges 6b direct the leading end 4a to a film passageway 9 in cooperation with guide ridges 6a formed on the upper shell half 13 to be described later. Upper and lower inside surfaces 9a and 9b of the film passageway 9 are provided with light trapping fabric 10 and 11 adhered thereto, the fabric consisting of velvet woven from rayon. The leading end 4a of the negative film 4 is fed between the fabric 10 and 11, and is advanced to the outside of the cassette shell through a film passage mouth 12.

Tongues 15 and 16 are formed on edges of the upper and lower shell halves 13 and 14 along the lengthwise direction of the cassette 2. Once the fabric 10, 11 has been adhered, the upper and lower shell halves 13 and 14 are joined together to cause the tongues 15 and 16 to form the film passageway 9. Inner recesses 17, formed on the upper and lower inside surfaces 9a and 9b, extend in a direction perpendicular to the film passageway 9. Outer recesses 18 are formed in the film passage mouth 12 on the upper and lower inside surfaces 9a and 9b parallel to the inner recesses 17. An inclined plane is formed in the inner recesses 17 on the side near the film passage mouth 12 to enlarge the interval between the upper and lower inside surfaces 9a and 9b gradually in the inward direction parallel to the lengthwise direction of the cassette 2. This inclination prevents the inner recesses 17 from stopping the leading end 4a during advancement of the film. The inner recesses 17 in the present embodiment may be replaced with inclined recesses. Acrylic hot-melt adhesive agent 19, in a solid, stick-shape condition, is applied to the inner recesses 17.

Figure 3:
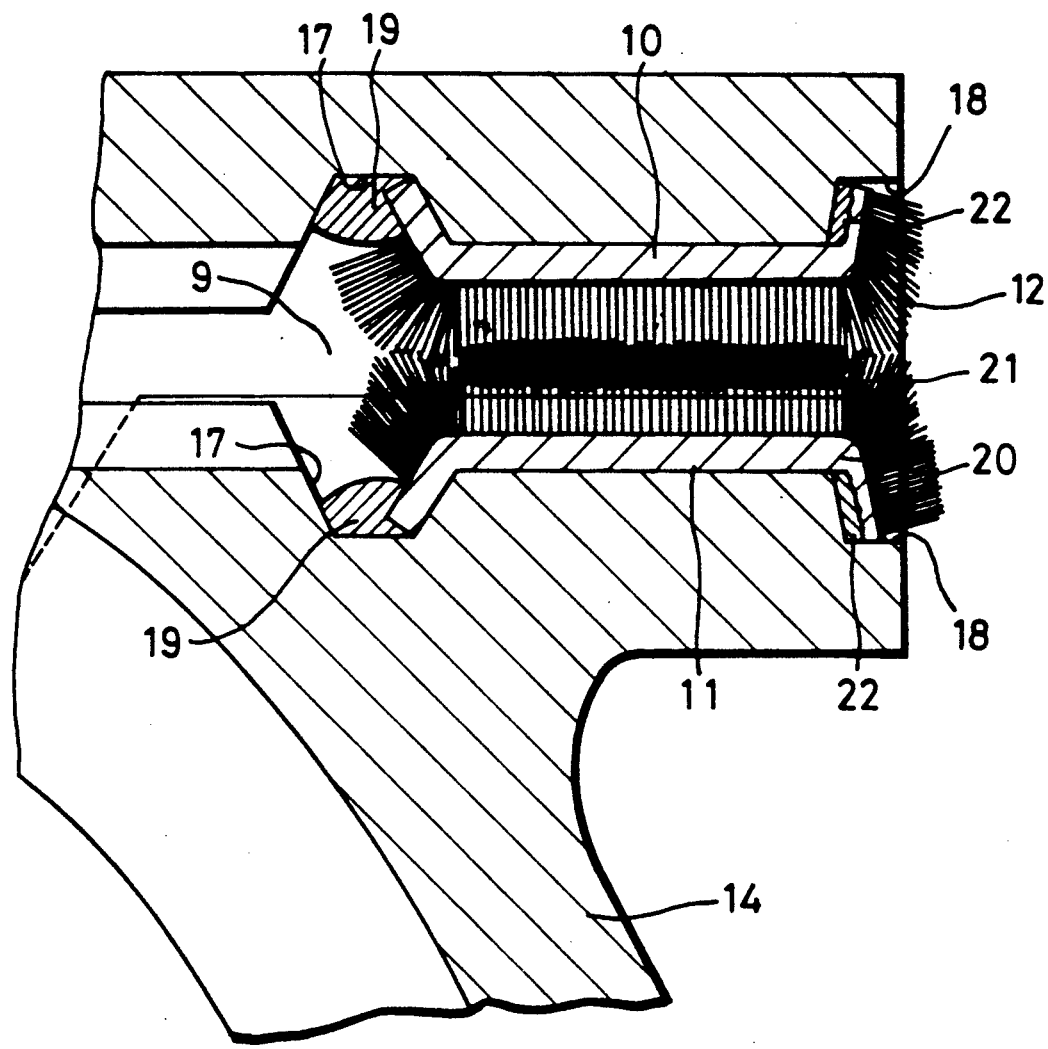
FIG. 3 is an enlarged section view of an important portion of the cassette of FIG. 1.

The fabric 10 and 11 consists of base fabric 20 and pile threads 21. Hot-melt adhesive agent 22 is applied to a plane in the outer recesses 18 to attach the outer edge of the base fabric 20 thereto. The inner edges of the fabric 10 and 11 are inserted in the inner recesses 17, while the outer edges are inserted in the outer recesses 18. The inner and outer edges are heated by a heat sealer to 200° C. for five seconds. The hot-melt adhesive agent 19 is melted in the inner recesses 17 to enclose the inner edges of the base fabric 20, while the hot-melt adhesive agent 22 is melted in the outer recesses 18 to attach the outer edges of the base fabric 20 to the upper and lower shell halves 13 and 14. When the adhesive agent 19 and 22 is cooled and hardened, the inner edges of the fabric 10 and 11 are attached to the inside of the inner recesses 17 in an enclosed state as shown in FIG. 3. The outer edges of the fabric 10 and 11 are adhered to the inclined plane in the outer recesses 18.

Although the hot-melt adhesive agent 19 and 22 is melted by the heat sealer in the present embodiment, other methods of adhesion, such as fusion and reactivation by use of ultrasound or high frequency energy, are acceptable. Also, although a solid hot-melt adhesive agent is melted in the inner recesses 17 in this embodiment, melted hot-melt adhesive agent may also be poured therein. Further, instead of applying the hot-melt adhesive agent 22, the inner edges of the fabric 10 and 11 may be enclosed by fusion of projecting portions formed in advance on the shell halves 13 and 14.

Figure 4:
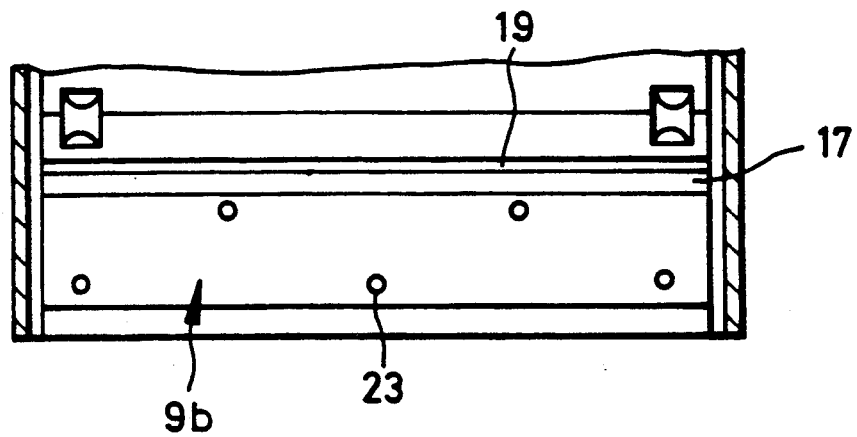
FIG. 4 is an explanatory view of a state disposing adhesive agent on a film passageway of the cassette of FIG. 1.

Because the fabric 10 and 11 is fixed at the inner and outer edges on the shell halves 13 and 14, the middle of the fabric 10 and 11 does not need to be adhered. However, it is possible to adhere the middle when necessary to adjust precisely the degree of contact or lapping between pile threads 21 of the upper and lower fabric 10 and 11. As shown in FIG. 4, dots of hot-melt adhesive agent 23 are applied to the lower inside surface 9b, because melting must be carried out without applying sufficient pressure to the entire middle of the fabric 10 and 11 to bend the pile threads 21. Preferably, the hot-melt adhesive agent 23 is prevented from being dotted in lines that are parallel to the direction of advancement of the negative film 4. Thus, the positions where the pile threads 21 are pressed can be sparse, so as to prevent light reliably from entering the cassette 2 through the film passageway 9.

Though rayon is used for manufacturing the fabric 10 and 11 in the present embodiment, other materials also may be used, including: synthetic fibers such as nylon, acrylic fibers, polyester, vinylon, vinyl chloride, vinylidene copolymer, polypropylene and polyethylene polycarbonate; and natural or regenerated fibers such as cupro-ammonium rayon, acetate, cotton and silk. Although the knitted fabric 10 and 11, having pile threads, is used as light trapping members, it also is possible to use film-type light trapping material, nonwoven fabric, fabric or film with pile threads planted thereon, synthetic leather, or elastic sponge-type material.

The operation of the above film cassette 2 according to the present invention now will be described. The film passageway 9 is shielded from light by the fabric 10 and 11 so as to keep the inside of the cassette 2 containing the whole of the film roll 4 light-tight up to the leading end 4a. When the camera is loaded with the cassette 2, a drive mechanism incorporated in the camera rotates the spool 5 in the unwinding direction. This rotation causes the leading end 4a to rotate in the same direction until contact with the separation claws 7, which separate the leading end 4a from the outermost turn of the film roll 4. The leading end 4a, having been separated in this fashion, is guided by the guide ridges 6a and 6b and fed to the film passageway 9.

The inner recesses 17 in the film passageway 9 are inclined so as to decrease the interval of the film passageway 9 in a direction toward the outside of the cassette 2, so that the tip 4a of the negative film 4 is never stopped by the inner recesses 17. The leading end 4a is guided by the inclined portions formed in inner positions on the fabric 10 and 11 to be directed toward a position of contact between the upper and lower of the pile threads 21. When the leading end 4a comes in contact with the inner positions of the fabric 10 and 11, the fabric 10 and 11 receive a force in the direction of peeling of the fabric 10 and 11. However, these never are peeled off because their inner edges are adhered in a condition enclosed in the hot-melt adhesive agent 19.

The leading end 4a then is advanced toward the outside of the cassette 2 through the film passageway 9 between the fabric 10 and 11, during which time the inside of the cassette 2 is kept light-tight because the pile threads 21 remain in contact with both surfaces of the negative film 4.

Figure 5:
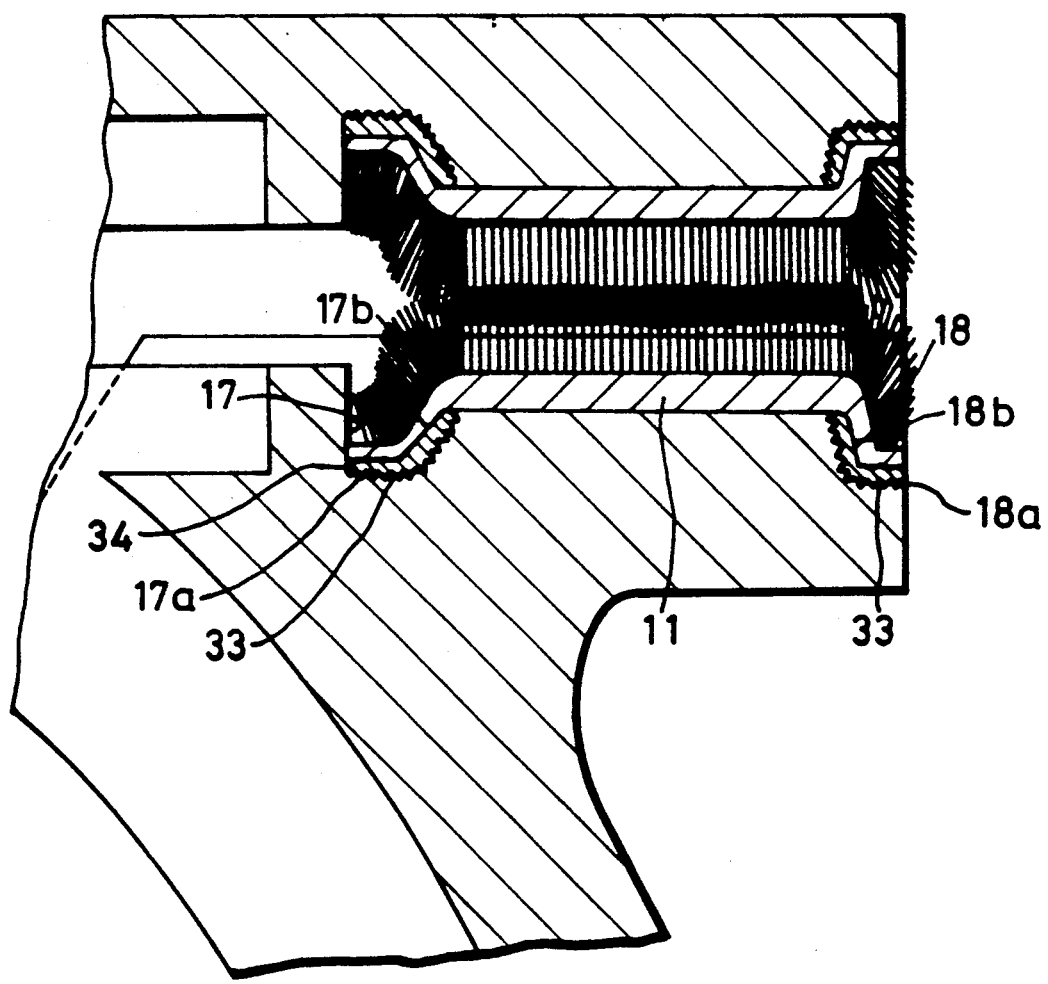
FIG. 5 is a sectional view of an important portion of a cassette according to another preferred embodiment of the invention.

In FIG. 5, which shows another preferred embodiment of the inventive film cassette, rough or uneven surfaces are formed by providing tiny grooves 33 on a bottom surface 17a and an inclined surface 17b in the inner recesses 17, and a bottom surface 18a and an inclined surface 18b forming the outer recesses 18. The tiny grooves 33 are formed integrally with the upper and lower shell halves 13 and 14 when they are molded. Each of the tiny grooves 33 is very small, so that two adjacent tiny grooves form a ridge having a tip separated by 0.1 mm from an adjacent, similar tip. Although the inside of the recesses 17 and 18 are formed with tiny grooves 33, they may be formed with tiny recesses in a densely dotted disposition. Such a construction makes it possible to enlarge the area to be attached to the fabric 10 and 11. Acrylic hot-melt adhesive agent is applied beforehand to the bottom surface 17a, the inclined surface 17b, the bottom surface 18a and the inclined surface 18b.

The inner and outer edges of the fabric 10 and 11 are positioned and heated with the adhesive agent on the adhesive-applying surfaces including the bottom surface 17a, the inclined surface 17b, the bottom surface 18a and the inclined surface 18b. In this manner, the degree of adhesion is intensified. In the present embodiment, the shell halves 13 and 14 are formed by molds with tiny ridges corresponding to the tiny grooves. Alternatively, molds with tiny projections may be used so that corresponding tiny recesses are formed on the shell halves 13 and 14. Such tiny recesses also may be formed by filing the molded shell halves. Rough surfaces with such tiny grooves or tiny recesses may be formed not only in the inner and outer recesses 17 and 18, but also on the entire surface of the film passageway 9 in contact with the fabric 10 and 11.

In the above embodiment, the hot-melt adhesive agent 34 is provided beforehand in the shell halves 13 and 14 and melted to adhere the fabric 10 and 11. However, melted hot-melt adhesive agent may be poured when the fabric 10 and 11 is adhered. Alternatively, hot-melt adhesive agent may be applied to both inner and outer edges of the fabric 10 and 11 to be melted. The hot-melt adhesive agent may be replaced with a pressure-sensitive adhesive agent, adhesive tape with pressure-sensitive adhesive agent applied to a base material, or a hardening agent to be hardened naturally or by heat after adhesion.

Experiments were conducted to compare the above embodiments with a conventional film cassette with respect to the adhesive force of the light trapping fabric. The light trapping fabric of Sample 1 was fixed on the film passageway by enclosing the inner edges thereof. The light trapping fabric of Sample 2 was fixed to the film passageway by attaching it to the adhesive-applying surfaces in the recesses having the tiny grooves. The light trapping fabric of the Comparative Example was adhered to a film passageway of Sample 2 which did not have the recesses. An Instron tension tester was used for the experiments. Part of the adhered light trapping fabric was peeled off in the direction vertical to the film advancing direction. The width of the light trapping fabric was 10 mm. The adhesive force was measured at a peeling speed of 10 cm per second.

After 24 hours at a temperature of 23° C. and a relative humidity of 65% after adhesion, the adhesive force was 1240 g/10 mm in Sample 1, 950 g/10 mm in Sample 2, and 320 g/10 mm in the Comparative Example. After 48 hours at a temperature of 60° C. and a relative humidity of 80%, the adhesive force was 1250 g/10 mm in Sample 1, 850 g/10 mm in Sample 2, and 150 g/10 mm in the Comparative Example.

These measured results show that the constructions of the present invention keep the adhesive force apparently stronger than that of a conventional film cassette. With the inner edges of the light trapping fabric enclosed and attached as in Sample 1, the adhesive force can be very strong. This strength is unchanged even at high temperature and high humidity.

Figure 6:
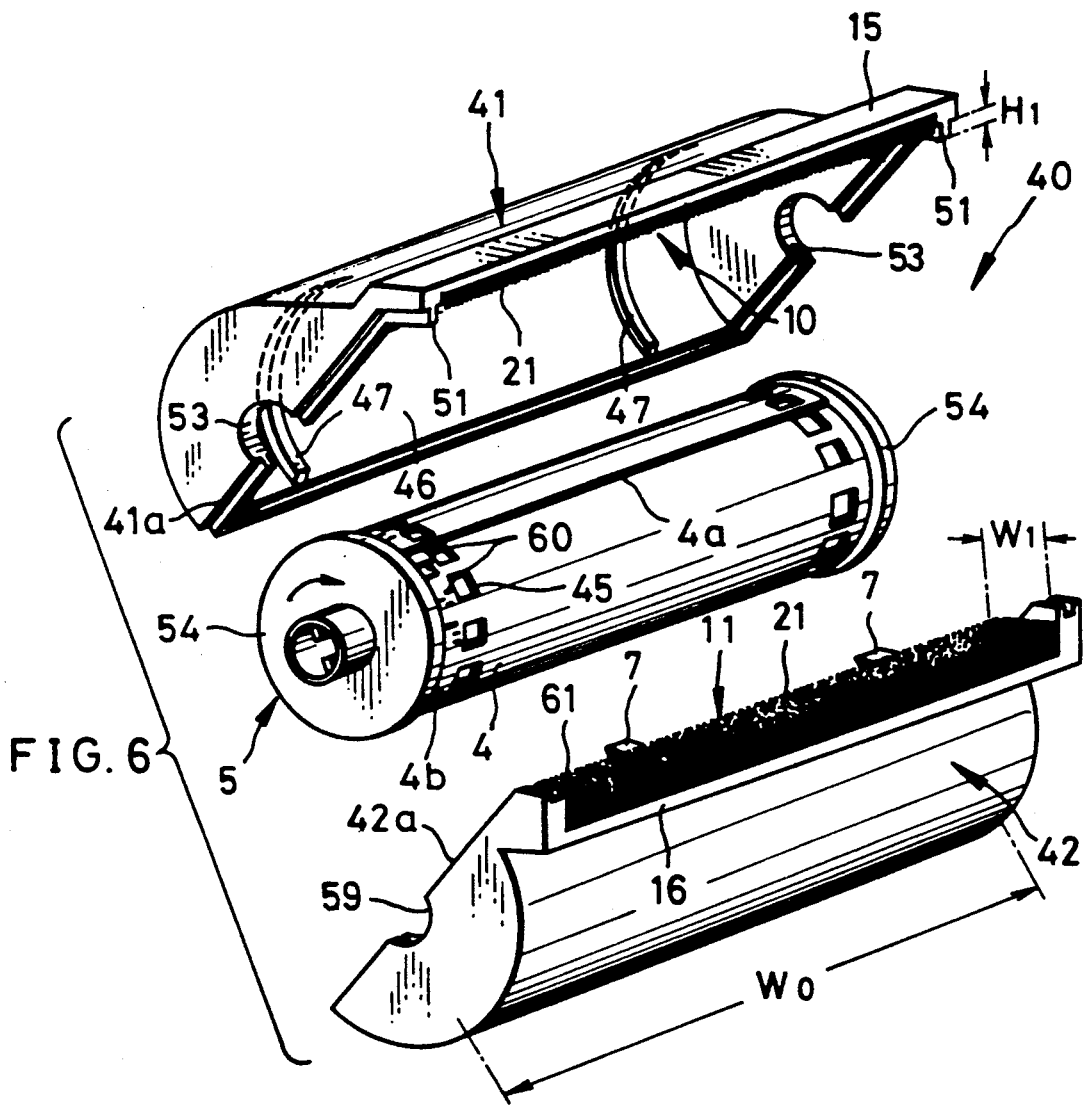
FIG. 6 is an exploded perspective view of a cassette in which lateral edge portions are shielded from light.

A film cassette 40, shown in FIG. 6, serves to prevent a fog from developing on the lateral edge portions of the negative film 4. Elements similar to those in the above embodiments are designated by the same reference numerals. The cassette 40 consists of an upper and lower shell halves 41 and 42 and the spool 5 with the negative film 4 wound thereon. A pair of annular ridges 47 are formed on an interior surface 46 of the upper shell half 41 to reduce the area of contact between the outermost turn of the film roll 4 and the interior surface 46, thereby making it easy to advance the leading end 4a as well as preventing the film roll 4 from loosening. Both shell halves 41 and 42 are made from a polymer which is a mixture of high-impact polystyrene with general polystyrene in a weight ratio of 50 to 50 with 0.5% by weight of carbon black added thereto. The upper shell half 41 is provided with a stepped edge 41a which is joined with the lower shell half 42. The stepped edge 41a is constituted by a central projection 51 of a height $H_1$. Both end faces of the upper shell half 41 are provided with bearing recesses 53 for rotatably supporting the spool 5 in cooperation with the counterpart of the lower shell half 42. The spool 5 is provided with a pair of ordinary flanges 54. Lateral edge portions 4b of the negative film 4 carry DX codes 60 which represent, for printing purposes, the type of film to be used. The fabric 10 and 11 disposed on the tongues 15 and 16 has a width $W_1$ of 5 mm. The separation claws 7 formed on the tongue 16 serve just to separate the leading end 4a, from which claws annular ridges (not shown) on the interior surface of the lower shell half 42 extend for connection with the ridges 47. The lower shell half 42 is provided with bearing recesses 59 on both end faces.

Figure 7:
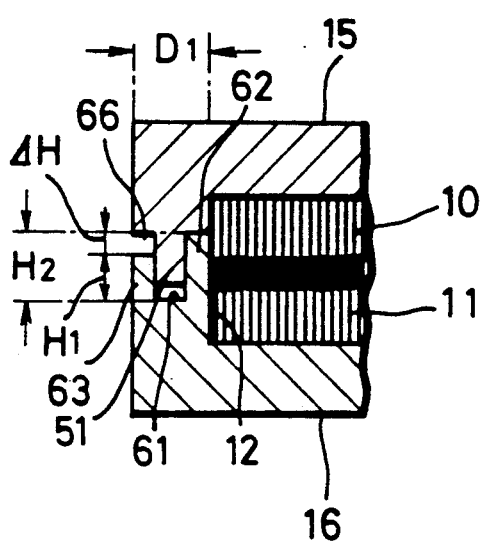
FIG. 7 is a sectional view of a film passageway of the cassette of FIG. 6.
Figure 8:
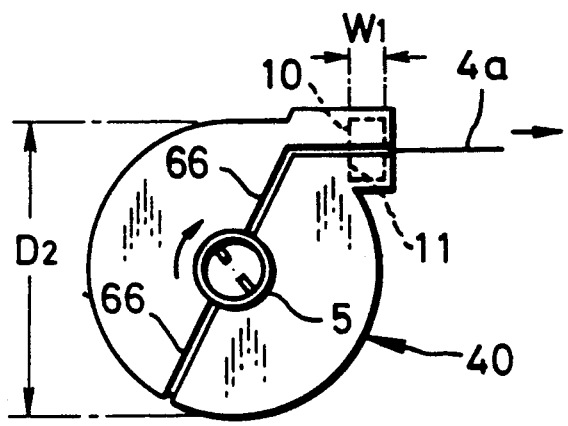
FIG. 8 is a front view of the cassette of FIG. 6.

A stepped edge 42a of the lower shell half 42 is retracted on the center forming a groove 61. On the inside, with reference to the lower shell half 42, a contact projection 62 defining the groove 61 has a height $H_2$, while an outside projection 63 defining the same on the outside has a height $H_1$, as shown in FIG. 7. Both of the shell halves 41 and 42 have a thickness $D_1$ of 0.8 mm. Joining of the shell halves 41 and 42 causes the tongues 15 and 16 to form the film passageway 9 and the film passage mouth 12. A spacing or groove 66 is defined between the shell halves 41 and 42 and has a width $\Delta H$ which is equal to $H_2 - H_1$, and determined to be substantially 0.15 mm. The spacing 66 surrounds the exterior periphery of the cassette 40, as shown in FIG. 8. Because the interior surface of the cassette shell has no such spacing, external light is prevented from entering the cassette 40 through the stepped edges 41a and 42a, thereby preventing fogging from being generated on the lateral edge portions 4b. The diameter $D_2$ of the cassette 40 is determined to be 23 mm. Its length $W_0$ in the direction parallel to the spool 5 is determined to be 41 mm.

When the exposure of the film 4 is completed, the cassette 40 is unloaded from the camera. The stepped edges 41a and 42a shield the negative film 4 reliably in the film passageway 9. Accordingly, the lateral edge portions 4b of the negative film 4 are not fogged, so that the DX code 60 can be read out at printing time. Experiments were made to investigate light shielding capability. Ten of the above film cassettes 40 and ten conventional cassettes were subjected to a light of 100,000 lux for three minutes, after which negative film was drawn out from the cassettes and developed. In five of the ten conventional cassettes, there was fogging on the lateral edge portions of the film roll on the three or five outermost turns, while no fogging was recognized on the negative film 4 of the cassettes 40.

Figure 9:
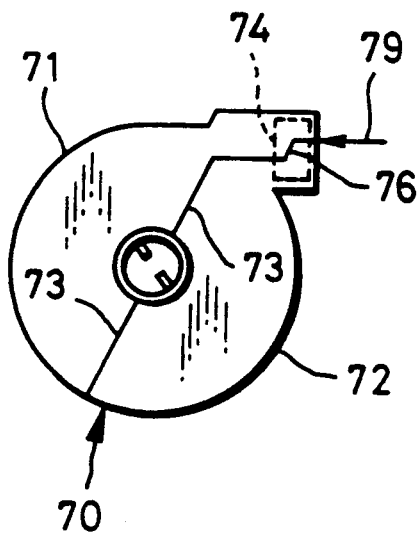
FIG. 9 is a front view of a cassette according to another preferred embodiment of the invention.
Figure 10:
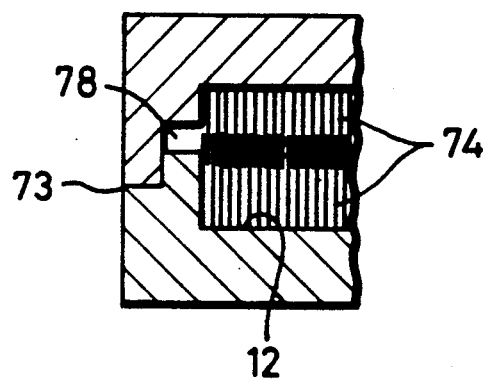
FIG. 10 is a sectional view of a film passageway of the cassette of FIG. 9.

In FIG. 9, showing a film cassette 70 according to another preferred embodiment, a juncture 73 of upper and lower film cassettes 71 and 72 includes a deformed or crooked portion 76 in a position beside a light trapping fabric 74, where the juncture 73 is not straight. The film passage mouth 12 of the cassette 70 includes a spacing 78 on the lateral sides, as shown in FIG. 10. However, external light 79 entering the cassette 70 through the spacing 78 is reflected and scattered by the crooked portion 76 and is absorbed by the fabric 74. Although the spacing 78 is the same as that in a conventional cassette, fogging is prevented reliably on the lateral edge portions 4b of the negative film 4. No fogging was discerned after performing an experiment on the cassette 70 in the same manner as for the above embodiment.

Figure 11:
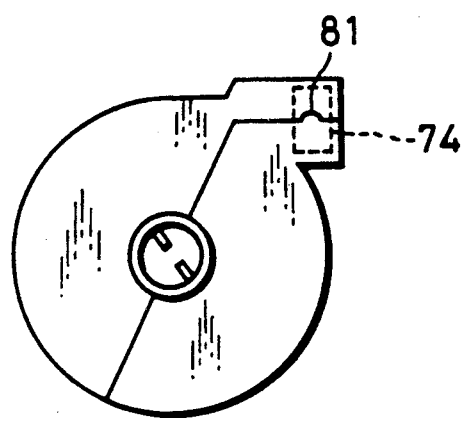
FIG. 11 is a front view of a cassette according to yet another preferred embodiment of the invention.

A similar effect is brought by an arcuate-shape crooked portion 81 beside the fabric 74, as shown in FIG. 11. The fabric 74 may be replaced with a sponge-type light trapping member disposed in the film passageway 9.

Figure 12:
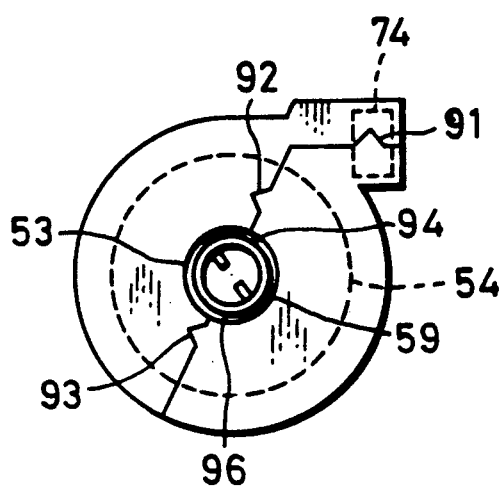
FIG. 12 is a front view of a cassette according to a still further preferred embodiment of the invention.

In addition to the crooked portion 91 beside the fabric 74, crooked portions 92 and 93 may be arranged beside the flanges 54 of the spool 5, as shown in FIG. 12. Through spacings 94 and 96 defined between the spool 5 and the bearing recesses 53 and 59, external light enters the cassette shell, but is reflected or scattered by the crooked portions 92 and 93 and absorbed by the flanges 54. Accordingly, it is possible to shield the cassette completely from light. It is noted that the spacings 94 and 96 are shown in exaggerated form, particularly in FIG. 12, but actually are tiny.

Figure 13A:
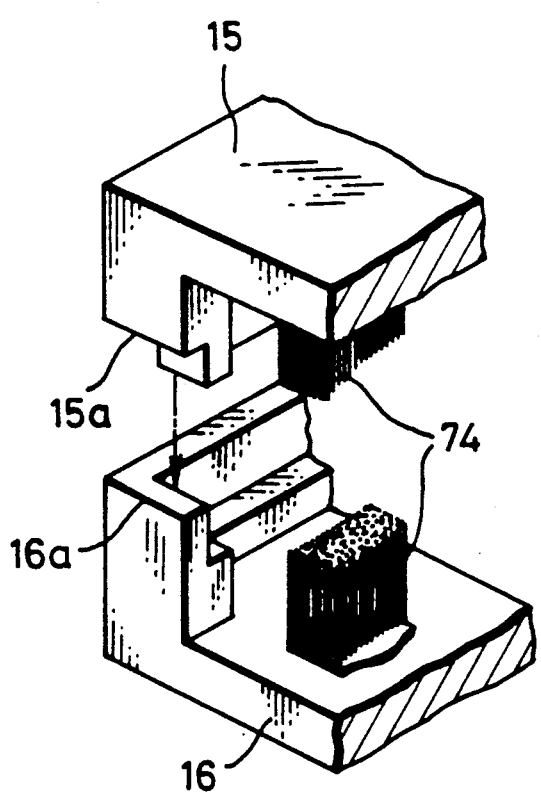
FIGS. 13A and 13B are schematic diagrams of a film passage mouth of a cassette according to another preferred embodiment of the invention.
Figure 13B:
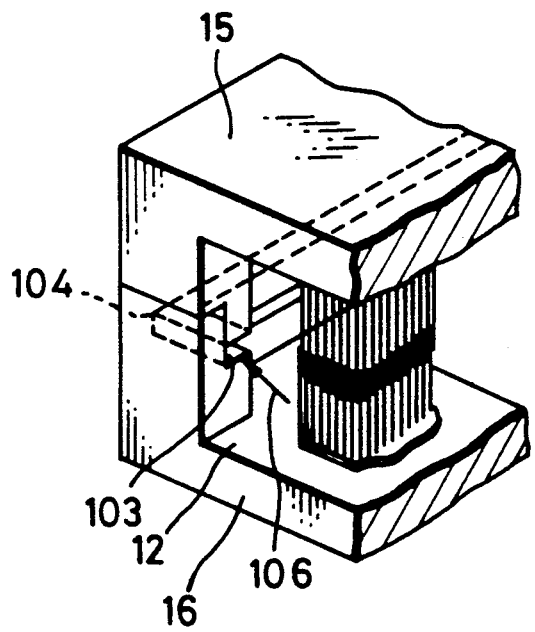
Figure 14:
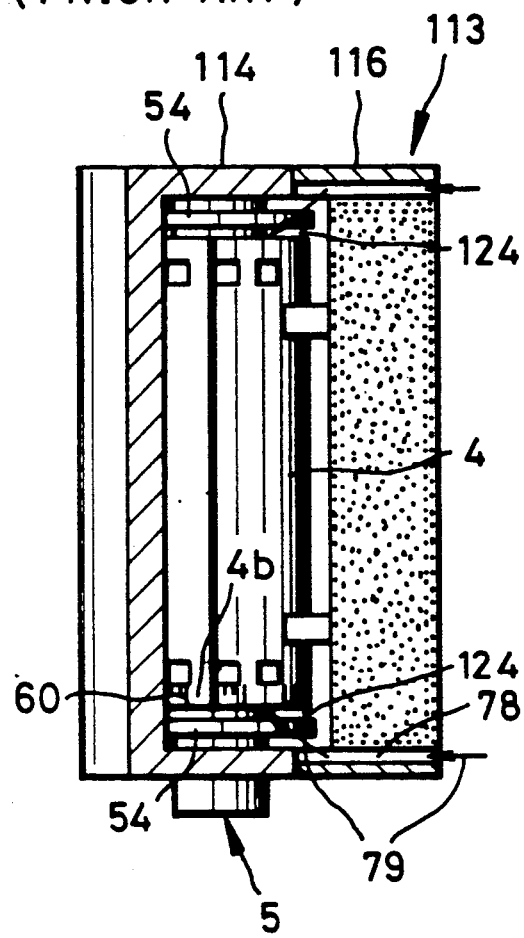
FIG. 14 is an explanatory view of a conventional cassette.
Figure 15:
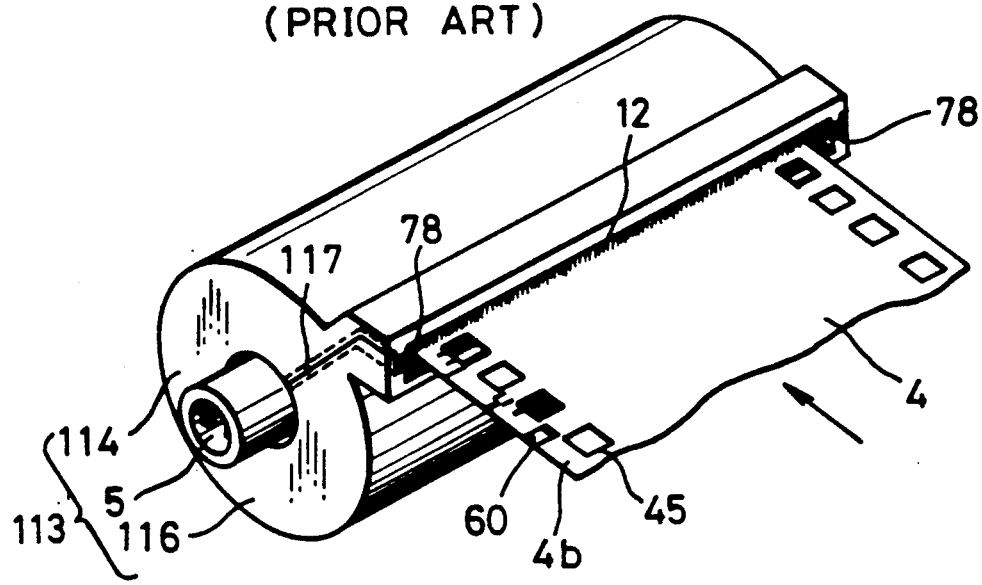
FIG. 15 is a perspective view of the conventional cassette of FIG. 14.

Furthermore, crooked edges 15a and 16a may be formed on the tongues 15 and 16 to become parallel to a plane defined by the film passage mouth 12, as shown in FIG. 13A. When two shell halves are fitted together, a spacing 103 is defined along the juncture inside the film passage mouth 12, as shown in FIG. 13B. The spacing 103 is crooked at an inner corner 104. Entering the spacing 103, external light 106 is reflected or scattered by the inner corner 104, and is absorbed by the fabric 74. Light shielding capacity is highly improved by this construction beside the lateral edge portions of the negative film.

All of the above-described embodiments involve a self-advancing film cassette, even with the leading end 4a of the film roll 4 contained in the cassette shell, wherein rotation of the spool 5 causes the leading end 4a to advance outside the cassette shell. However, these embodiments can be applied to a general type of film cassette with the leading end 4a of the negative film 4 protruding outside the cassette shell.

While the present invention has been described in detail with reference to a preferred embodiment, various modifications within the scope and spirit of the invention will be apparent to those of working skill in this technological field. Thus, the invention should be considered as limited only by the appended claims.

What is claimed is:

1. A photographic film cassette having a spool with photographic film wound thereon and a cassette shell for containing the film in a light-tight fashion and for supporting the spool rotatably, a film passageway being formed on said cassette shell for directing the film to a film passage mouth of said cassette, means for advancing a film leader of said film through said film passageway by rotating said spool toward an outside of said film passage mouth, and two light trapping members provided respectively on upper and lower inside surfaces of said film passageway for trapping light; said cassette comprising:

two inner recess portions, associated with said upper and lower inside surfaces, for increasing a degree of retraction from said upper and lower inside surfaces in an inward direction toward an inside of said cassette shell, inner edges of said two light trapping members being attached to respective ones of said two inner recess portions so as to increase an interval between upper and lower inside surfaces of said two light trapping members in the inward direction on said inner edges, so that a leading end of said film leader is surely advanced into a path between said two light trapping members toward the outside of said film passage mouth;

further comprising an adhesive agent for completely enclosing said inner edges of said two light trapping members, thereby to attach said two light trapping members to respective ones of said two inner recess portions.

2. A photographic film cassette as defined in claim 1, wherein said cassette shell includes first and second shell halves, separated at a junction dividing said film passageway and an opening for supporting said spool.

3. A photographic film cassette as defined in claim 1, further comprising two outer recess portions, retracted respectively from said upper and lower inside surfaces, for attaching thereto outer edges of said respective light trapping members with respect to said cassette shell in order to attach said outer edges to positions retracted from said upper and lower inside surfaces.

4. A photographic film cassette as defined in claim 3, wherein surfaces to be attached to said light trapping members are inclined in said inner and outer recess portions.

5. A photographic film cassette as defined in claim 1, wherein said light trapping members comprise fabric.

6. A photographic film cassette as defined in claim 3, further comprising an adhesive agent, provided on at least one of said upper and lower inside surfaces in dots between said inner and outer recess portions, for attaching said light trapping fabric thereto.

7. A photographic film cassette as defined in claim 2, further comprising light-shielding means, formed in said junction, for shielding a lateral edge portion of said film from light.

8. A photographic film cassette as defined in claim 7, wherein:

said first and second shell halves include respective first and second edges formed thereon, said junction being formed when said first and second edges are joined together; and said light-shielding means includes a first projection formed at said first edge and an inside projection of said second edge formed inside said second shell half, said inside projection being fitted in an inside recess of said first edge formed inside said first shell half at a bottom of said first projection.

9. A photographic film cassette as defined in claim 7, wherein said light-shielding means comprises a deformed portion formed along said junction.

10. A photographic film cassette as defined in claim 9, wherein said deformed portion is formed in a position where said junction is in contact with both lateral ends of said light trapping members.

11. A photographic film cassette as defined in claim 10, wherein said deformed portion has a crank shape.

12. A photographic film cassette as defined in claim 10, wherein said deformed portion has a V shape.

13. A photographic film cassette as defined in claim 10, wherein said deformed portion has an arcuate shape.

14. A photographic film cassette as defined in claim 9, wherein said deformed portion is formed in a position where said junction is arranged beside outside surfaces of flanges of said spool.

15. A photographic film cassette as defined in claim 9, wherein said junction is bent toward said light trapping members at both lateral ends of said film passage mouth to form said deformed portion.

16. A photographic film cassette having a spool with photographic film wound thereon and a cassette shell for containing the film in a light-tight fashion and for supporting the spool rotatably, a film passageway being formed on said cassette shell for directing the film to a film passage mouth of said cassette, means for advancing a film leader of said film through said film passageway by rotating said spool toward an outside of said film passage mouth, and two light trapping members provided respectively on upper and lower inside surfaces of said film passageway for trapping light; said cassette comprising:

two inner recess portions, associated with said upper and lower inside surfaces, for increasing a degree of retraction from said upper and lower inside surfaces in an inward direction toward an inside of said cassette shell, inner edges of said two light trapping members being attached to respective ones of said two inner recess portions so as to increase an interval between upper and lower inside surfaces of said two light trapping members in the inward direction on said inner edges, so that a leading end of said film leader is surely advanced into a path between said two light trapping members toward the outside of said film passage mouth, wherein said two inner recess portions are provided with respective rough portions for enlarging an attachment force of said light trapping members to said film passageway, and further wherein said rough portions include a plurality of tiny grooves formed parallel to a longitudinal axis of said spool.

17. A photographic film cassette having a spool with photographic film wound thereon and a cassette shell for containing the film in a light-tight fashion and for supporting the spool rotatably, said cassette shell including a film passageway for directing the film to a film passage mouth of said cassette, said cassette comprising:

two shell halves, separated at a junction dividing said film passageway and an opening for supporting said spool; and a deformed portion, formed in said junction, for shielding a lateral edge portion of said film from light, said deformed portion extending across an entire width of said junction and projecting beyond said junction at a portion thereof located at sidewall portions of said film passageway, wherein said deformed portion is formed in a position where said junction is in contact with both lateral ends of said light trapping members.

* * * * *